(12) United States Patent
Wang

(10) Patent No.: US 10,034,340 B2
(45) Date of Patent: Jul. 24, 2018

(54) ELECTRICAL LIGHTING SYSTEM POWER CONTROL

(71) Applicant: PHILIPS LIGHTING HOLDING B.V., Eindhoven (NL)

(72) Inventor: Xiangyu Wang, Eindhoven (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 198 days.

(21) Appl. No.: 14/346,808

(22) PCT Filed: Oct. 5, 2012

(86) PCT No.: PCT/IB2012/055359
§ 371 (c)(1),
(2) Date: Mar. 24, 2014

(87) PCT Pub. No.: WO2013/050970
PCT Pub. Date: Apr. 11, 2013

(65) Prior Publication Data
US 2014/0232299 A1    Aug. 21, 2014

Related U.S. Application Data

(60) Provisional application No. 61/543,861, filed on Oct. 6, 2011.

(51) Int. Cl.
H05B 33/08 (2006.01)
H04L 12/10 (2006.01)
(Continued)

(52) U.S. Cl.
CPC ......... *H05B 33/0842* (2013.01); *H04L 12/10* (2013.01); *H04L 12/12* (2013.01);
(Continued)

(58) Field of Classification Search
None
See application file for complete search history.

(56) References Cited

U.S. PATENT DOCUMENTS 5,153,580 A * 10/1992 Pollack ............... G04G 15/006
340/12.22
5,375,051 A * 12/1994 Decker ................. G06F 1/3215
363/49
(Continued)

FOREIGN PATENT DOCUMENTS

CN          101335747 A       12/2008
EP          0417788 A2        3/1991
(Continued)

OTHER PUBLICATIONS

IEEE Standard 802.3AF, Part 3: Carrier Sense Multiple Access With Collision Detection(CSMA/CD) Access Method and Physical Layer Specifications, 2003, 133 Pages.

*Primary Examiner* — Jeffrey M Rutkowski
*Assistant Examiner* — Andre Tacdiran
(74) *Attorney, Agent, or Firm* — Meenakshy Chakravorty

(57) ABSTRACT

A network switch (5) for example a PoE switch, is operable to control supply of electrical power to individual luminaires (1,2) in a lighting network. The luminaires receive both electrical power for operation and signals to switch on and off through a common cable connection (9) such as an Ethernet connection. When switched on, each luminaire sends a signal repeatedly towards the Po E switch until switched off and the switch (5) supplies power to the luminaire while successive signals are received within a period less than a predetermined shut off period ($\Delta$). In this way, power to the luminaire can be disconnected to avoid consumption of standby power when not in use.

7 Claims, 3 Drawing Sheets

(51) Int. Cl.
*H04L 12/12* (2006.01)
*H04L 12/24* (2006.01)
*H04L 12/46* (2006.01)
*H05B 37/02* (2006.01)
*H04L 12/26* (2006.01)

(52) U.S. Cl.
CPC ...... *H04L 12/4625* (2013.01); *H04L 41/0833* (2013.01); *H04L 43/10* (2013.01); *H05B 37/0254* (2013.01); *Y02D 50/40* (2018.01); *Y02D 50/42* (2018.01); *Y10T 307/461* (2015.04); *Y10T 307/74* (2015.04)

(56) References Cited

U.S. PATENT DOCUMENTS

| | | | | |
|---|---|---|---|---|
| 5,555,167 | A * | 9/1996 | Fujihashi | G06F 1/3203 363/49 |
| 5,790,775 | A * | 8/1998 | Marks | G06F 11/1658 714/5.11 |
| 6,484,082 | B1 * | 11/2002 | Millsap | H04L 12/4035 701/32.7 |
| 7,552,348 | B1 * | 6/2009 | Lo | H04B 3/46 379/322 |
| 2003/0142515 | A1 * | 7/2003 | Kim | G06F 1/266 363/21.15 |
| 2004/0102931 | A1 * | 5/2004 | Ellis | A61B 5/1038 702/188 |
| 2005/0014499 | A1 * | 1/2005 | Knoblach | B64B 1/40 455/431 |
| 2005/0136989 | A1 * | 6/2005 | Dove | G06F 1/266 455/572 |
| 2006/0039290 | A1 | 2/2006 | Roden et al. | |
| 2006/0057967 | A1 * | 3/2006 | Shimada | G06F 1/3203 455/67.13 |
| 2007/0288784 | A1 * | 12/2007 | Koper | G06F 1/3203 713/324 |
| 2008/0294917 | A1 * | 11/2008 | Khan | G06F 1/3209 713/310 |
| 2009/0206759 | A1 * | 8/2009 | Wang | H05B 37/0218 315/151 |
| 2009/0228723 | A1 * | 9/2009 | Yoshizaki | H04L 12/10 713/300 |
| 2009/0249112 | A1 * | 10/2009 | Diab | H04L 12/10 714/2 |
| 2010/0026215 | A1 * | 2/2010 | Warton | H05B 37/0254 315/362 |
| 2010/0031070 | A1 * | 2/2010 | Tomomitsu | H04L 12/10 713/300 |
| 2010/0052576 | A1 * | 3/2010 | Steiner | H05B 37/0227 315/361 |
| 2010/0118753 | A1 * | 5/2010 | Mandin | H04L 67/145 370/311 |
| 2010/0145543 | A1 * | 6/2010 | Middlemiss | G06F 1/266 700/295 |
| 2010/0169677 | A1 * | 7/2010 | Madhusoodanan | H04L 12/4625 713/310 |
| 2010/0169689 | A1 * | 7/2010 | Liu | H04L 12/10 713/340 |
| 2010/0229015 | A1 * | 9/2010 | Hebron | H04L 12/10 713/323 |
| 2011/0022189 | A1 * | 1/2011 | Perry | H05B 37/0227 700/12 |
| 2011/0150431 | A1 * | 6/2011 | Klappert | H04N 7/163 386/296 |
| 2011/0255397 | A1 * | 10/2011 | Kadakia | H04L 41/0672 370/216 |
| 2012/0271477 | A1 * | 10/2012 | Okubo | H04L 12/10 700/297 |
| 2012/0286673 | A1 * | 11/2012 | Holland | H05B 33/0854 315/155 |
| 2013/0082536 | A1 * | 4/2013 | Taylor | H02J 7/025 307/104 |
| 2014/0351622 | A1 * | 11/2014 | Farrar | G06F 1/266 713/340 |
| 2018/0049300 | A1 * | 2/2018 | Recker | H05B 37/0218 |
| 2018/0052510 | A1 * | 2/2018 | Dickens | G06F 1/3209 |

FOREIGN PATENT DOCUMENTS

| | | |
|---|---|---|
| EP | 2051437 A1 | 4/2009 |
| JP | 2006094013 A | 5/2006 |
| JP | 2008003863 A | 1/2008 |
| JP | 2008186604 A | 8/2008 |
| JP | 2009284116 A | 12/2009 |
| WO | 2005101733 A1 | 10/2005 |

\* cited by examiner

ELECTRICAL LIGHTING SYSTEM POWER CONTROL

CROSS-REFERENCE TO PRIOR APPLICATIONS

This application is the U.S. National Phase application under 35 U.S.C. § 371 of International Application No. PCT/IB2012/055359, filed on Oct. 5, 2012, which claims the benefit of U.S. Provisional Application No. 61/543,861, filed on Oct. 6, 2011. These applications are hereby incorporated by reference herein.

FIELD OF THE INVENTION

This invention relates to electrical power control for lighting systems and has particular but not exclusive application to Power over the Ethernet (PoE) lighting systems.

BACKGROUND OF THE INVENTION

Some electrical lighting units such as LED luminaires can be driven at a lower voltage than a conventional mains AC supply, making low voltage.power distribution feasable in a lighting network.

PoE has been developed for supplying low voltage power from a source such as a PoE switch, to a powered device such as a wi-fi access point or video camera, through the same Ethernet cable that carries signals to and from the device. This greatly simplifies installation of networked devices because only one cable is needed for both power and communication. Power is typically supplied from a PoE switch in common mode over the differential pairs of wires found in Ethernet cables. The IEEE 802.3at-2009 PoE standard permits up to 25.5 W of power to be supplied to the network powered devices. Also, non-standardized PoE schemes have been proposed and implemented hitherto.

There is a growing interest in using PoE technology for networked lighting systems. PoE provides a power efficiency advantage for low voltage DC power lighting systems, for example LED based lighting systems where the LED luminaires are connected by Ethernet cabling to a common PoE switch, because only one central AC/DC conversion is needed at the PoE switch to convert AC mains into a low voltage DC supply that can be supplied through the Ethernet cabling to the luminaires.

However, the luminaires in a lighting network are switched on and off repeatedly, in contrast to PoE systems that provide power to network cameras and wi-fi units, which are usually configured to be always on. It would be desirable to switch off the delivery of power through the network to the luminaires that are not in use in order to minimize the standy power consumed by the inactive luminaires, but without requiring a specially designed lighting network controller for PoE or without individually commisioning the PoE switches.

SUMMARY OF THE INVENTION

In a first aspect the invention provides a network switch operable to control supply of electrical power to a network device, the switch being configured to to supply power to the device upon receiving a signal destned for the device and continuing to supply power to the device whilst successive signals from the device are received within a period less than a predetermined shut off period.

The network switch may include multiple ports for different network devices, for example luminaires of a lighting network, and can be responsive to whether communication is active or not on one of its ports to determine whether to supply or to cut off power to the luminaire that is connected to the port of the switch. The switch is further configured with a time period by which to determine whether the luminaire is still in active communication mode or not.

In this way, the network switch need not to manage power supply to its port based on explicit power management commands that it may receive; rather the network switch determines on a passive listening basis whether to supply power to one of the devices connected to it based on the activity. The benefit is that the network switch can be an of-the-shelf switch with some configuration or very little firmware update. There is no need to provide a network switch that understands application messages such as "turn luminiare on/off".

In a second aspect the invention provides a device configured to receive from a remote location both electrical power for operation and a command signal to switch on, through a common cable connection, and in response to switching on, to send to the remote location a signal repeatedly until switched off.

The network device may be a luminaire configured to receive from a remote location both electrical power for operation and a command signal to switch on, and in response to switching on, to send to the remote location a communication message that does not contain any explicit request for supplying power but is just used to indicate to the network switch that it is active. The luminaire continues sending the messages repeatedly until switched off.

By switching off the power supply when the luminaire is off, minimal stand-by power consumption occurs for the luminaire and the network switch.

The invention also includes a computer program to be run by a processor of a PoE switch operable to control supply of electrical power to a network device, the program being responsive to signals from the device and to supply power to the device whilst successive signals are received from the device within a period less than a predetermined shut off period.

The program may be responsive to a communication message destinated for a network device such as a luminaire for the supply of power to the luminaire via its port and to supply power to the luminaire whilst successive ones of the communication messages are received within a period less than a predetermined shut off period. The invention further includes a method of operating the switch and the luminaire respectively.

BRIEF DESCRIPTION OF THE DRAWINGS

In order that the invention may be more fully understood an embodiment thereof will now be described by way of illustrative example with reference to the accompanying drawings in which.

DETAILED DESCRIPTION

Figure 1:
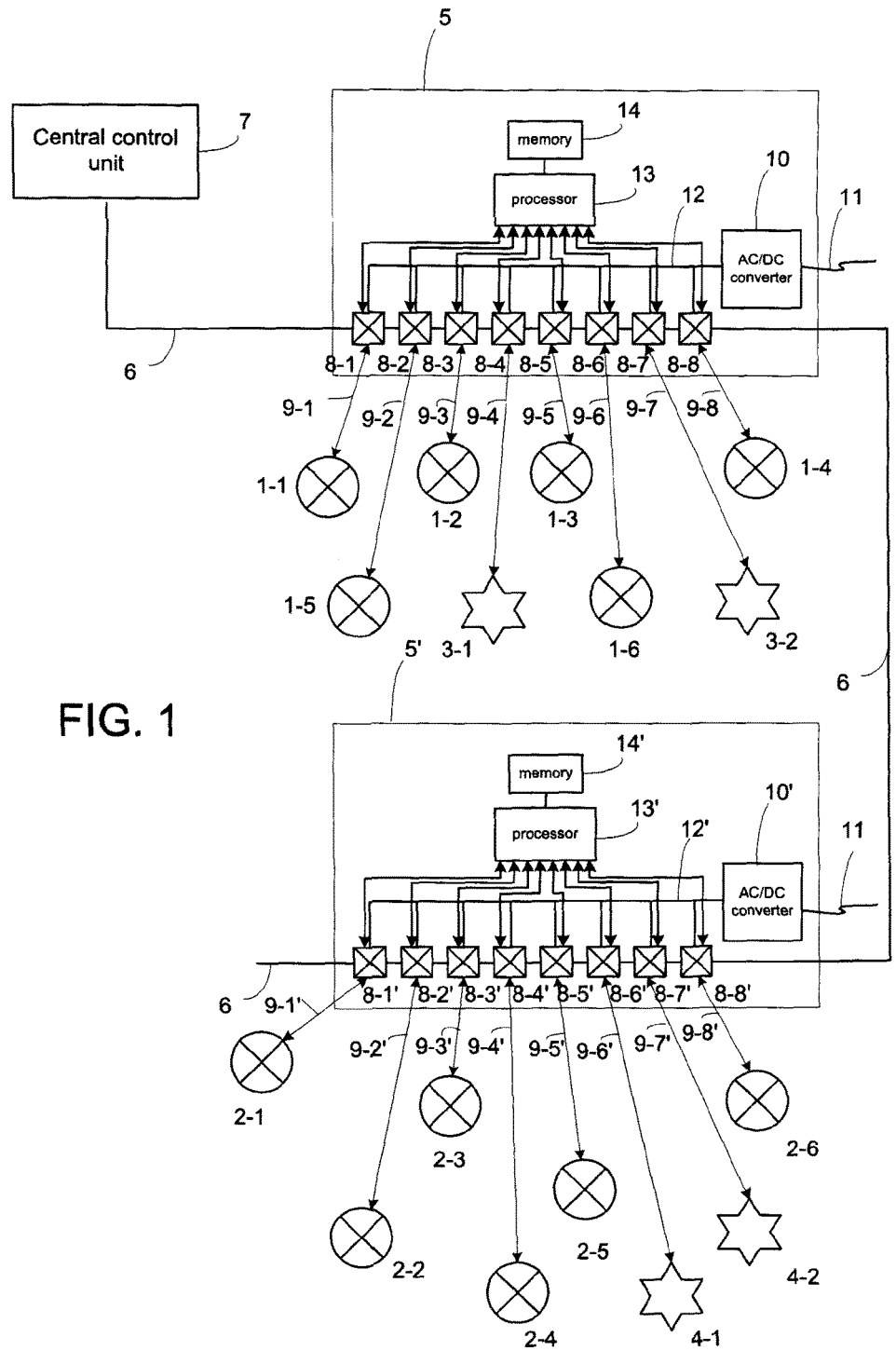
FIG. 1 is a schematic block diagram of a LED lighting network controlled by two PoE switches.

Referring to FIG. 1, a low voltage LED lighting network is illustrated schematically in which LED luminaires 1-1 . . . 1-6; 2-1 . . . 2-6 are connected in the network with sensors 3-1, 3-2; 4-1, 4-2.

The luminaires 1 and sensors 3 are coupled to a first PoE switch 5 and luminaires 2 along with sensors 4 are connected to a second PoE switch 6. The first and second PoE switches 5, 6 are connected in a digital network which allows IP data signals to be communicated between the switches and also a central lighting control unit 7 operable to transmit individually addressed IP data signals to the luminaires through the switches 5, 6. The communication between the central control unit 7 and the individual luminaires 1, 2 may be in any suitable digital format, for example the well known Digital Addressable Lighting Interface (DALI) format.

Considering the PoE switch 5 in more detail, a plurality of inputs/outputs that include switching elements 8-1 . . . 8-8 are connected by runs of Ethernet cable 9-1 . . . 9-8 respectively to individual ones of the luminaires 1 and sensor 3 as illustrated in FIG. 1. The switch 5 includes an AC/DC converter 10 that receives an AC main supply 11 e.g. 240V and provides a low voltage DC output on line 12 e.g. at 9V which is supplied to each of the switching elements 8 for supply to the individual luminaires and sensors through Ethernet cabling 9. The DC power is supplied under the control of a processor 13 that has an associated memory 14 which stores a power control program to be run by the processor, as explained in more detail hereinafter. The DC power may be supplied through the Ethernet cables in accordance with the IEEE 802.3at-2009 PoE standard.

Similarly, a second PoE 5' includes AC/DC converter 10' that provides corresponding DC output on line 12' which is switched through switching elements 8-1' . . . 8-8' to respective ones of the luminaires and sensors 2, 4 under the control of processor 13' that runs a corresponding power control program stored in memory 14'. The PoEs 5,5' are connected in a lighting network through Ethernet cabling 6 and in communication with a central lighting control unit 7.

Figure 2:
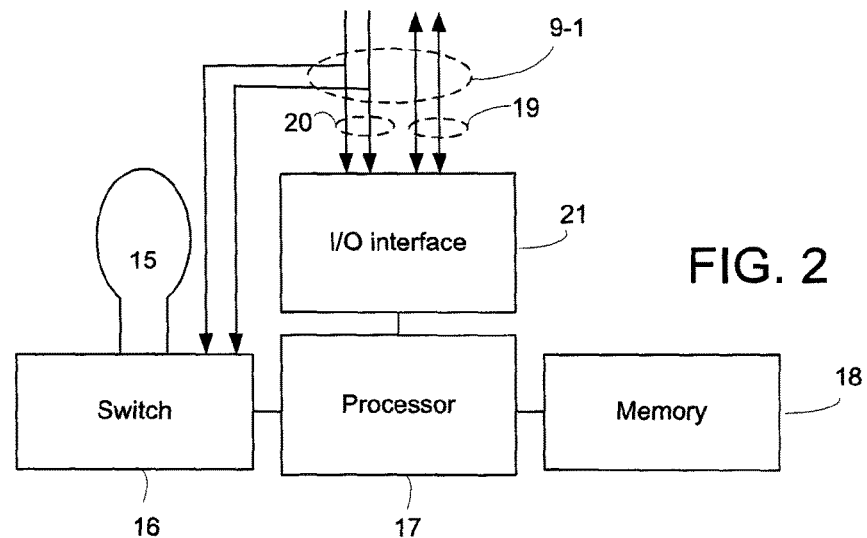
FIG. 2 is a schematic block diagram of a luminaire for the network.

Referring to FIG. 2, the individual luminaires 1, 2 each comprise a low voltage luminaire element, such as an LED lamp or lighting device 15 that receives a low voltage DC supply through a switch 16 under the control of a processor 17 with an associated memory 18. In the following discussion, the connection and operation of luminaire 1-1 through Ethernet cabling 9-1 to PoE switch 5 through switching element 8-1 will be described in more detail, it being understood that the corresponding connections to the other luminaires 1, 2 are the same. As shown in FIG. 2, the Ethernet cable 9 comprises a plurality of differential pairs of wires, two of which 19, 20 are shown. The differential pair 19 carries data for controlling operation of the luminaire 1-1 and runs between the network cable 6 and an input/output interface 21 coupled to the luminaire processor 17 shown in FIG. 2. The differential pair 20 provides low voltage DC power to the luminaire from AC/DC converter 10 for periods determined by processor 17.

Each luminaire has an individual address stored in memory 18. The processor 17 can transmit signals through wires 19 of the Ethernet cable 9-1 to the network 6 through the interface 21 and similarly can receive commands from the network 6 through wires 19 in order to control operation of the switch 16.

Figure 3:
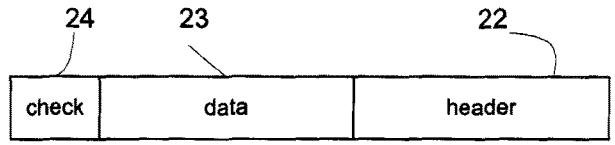
FIG. 3 is a schematic datagram of instructions sent through the network.

The general format of lighting control signals transmitted over wires 19 and through the network 6 is shown in FIG. 3, and comprises a datagram that includes header bits 22 that include a source address from which the datagram has been transmitted and a header address to which the datagram is directed. Header bits corresponding to unicast and broadcast transmissions can be included in the header 22. The datagram also includes data bits 23 corresponding to instructions to be performed at the destination, along with check bits 24 for use in checking at the destination in order to detect transmission errors.

Figure 4:
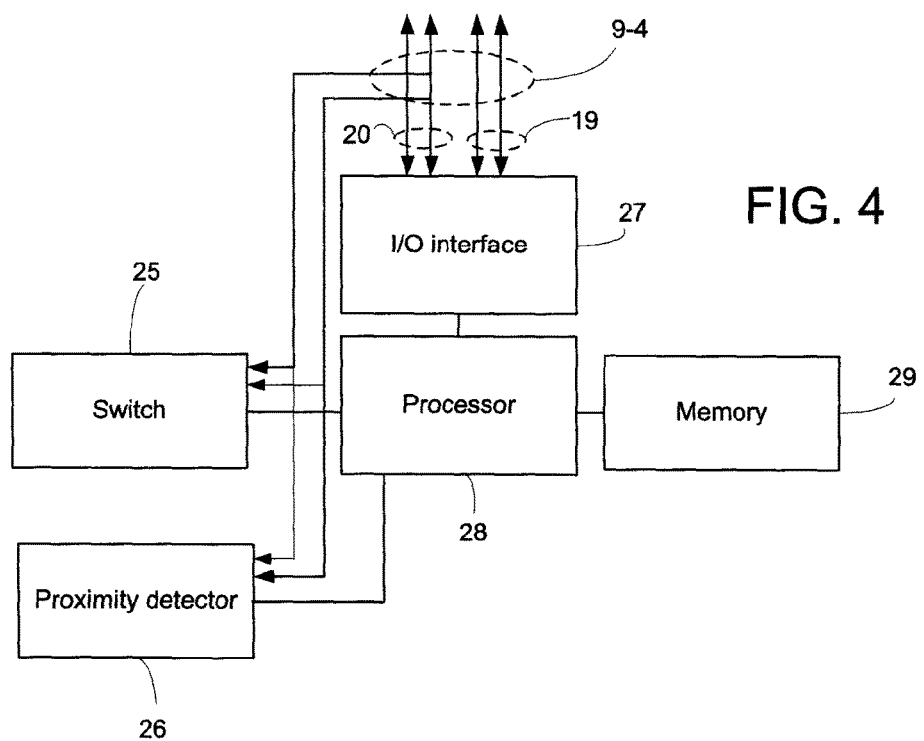
FIG. 4 is a schematic block diagram of a sensor comprising a switch and/or a proximity detector.

FIG. 4 illustrates an example of the structure of one of the sensor devices 3, 4. A particular example of sensor 3-1 is illustrated, connected to switching element 8-4 through Ethernet cable 9-4, it being understood that the other sensor connections are the same. The sensor 3-1 includes in this example a manually operated switch 25 and also a proximity sensor 26 e.g. an IR movement detector which may be located in a particular space in the premises to detect occupants and trigger operation of a particular group of luminaires. It will be understood that the switch 25 can be a wall switch for use in a particular space. The individual sensors 3,4 may include either a switch 25 or a proximity detector 26 or both depending on the desired functionality. The switch 25 and proximity detector 26 are powered by low voltage DC power from the AC/DC converter 10 through switching element 8-4. The DC power will be normally on but could be switched off by processor 13 should it be desirable to disable the sensor 3-1. Data is transmitted between the sensor 3-1 and the network connection 6 through wires 19 coupled to input/output interface 27 that is coupled to processor 28 with associated memory 29. Thus, when the switch 25 or proximity detector 26 is activated, the processor 28 produces a datagram corresponding to that shown in FIG. 3, which may be transmitted to the PoE switch 5 and/or the central control unit 7 to indicate operation and so as provide a command to switch on associated luminaires.

When individual ones of the luminaires 1 are switched off, the processor 13 of switch 5 is configured to disable the supply of DC power to each switched off luminaire so as to prevent it from consuming standby power whilst switched off. This can result in a significant power saving for networks that include many luminaires.

Figure 5:
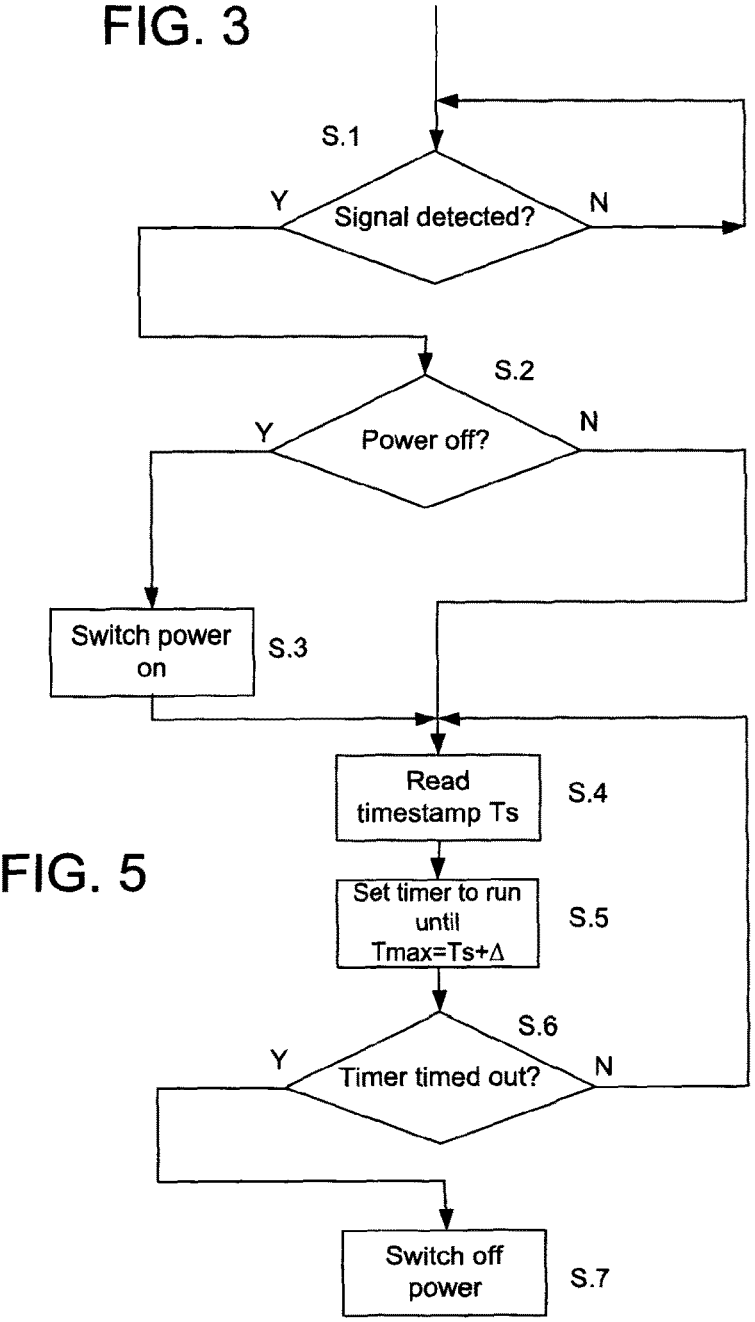
FIG. 5 is a flow chart of power control program run by the PoE switches.

The procedure for turning off the DC power supply for individual luminaires will now be described in more detail with reference to the flow chart shown in FIG. 5.

In a first scenario, any one sensor in a space, e.g. a room, will control all of the luminaires in the room. Thus, referring to FIG. 1, operation of any one of the sensors 3, 4 will turn on all of the luminaires 1, 2. In this scenario, an individual one of the sensors e.g. sensor 3-1 can transmit a signal from its processor 28 through interface 27 and wires 19 of the Ethernet cable 9-4 to the network 6, the signal being a format illustrated in FIG. 3 with the header 22 indicating a broadcast signal. On the assumption that all of the luminaires 1, 2 are initially off, the processor 13 of PoE switch 5 detects the signal transmitted from switch 3-1 and in response turns on DC power through the switching element 8-1 . . . 8-8 to each of the connected devices through wires 20 of the Ethernet cables 9-1 . . . 9-8 so as to power all of the luminaires. A similar process occurs at PoE switch 5' so that all of the luminaires 2 are powered up.

Considering the luminaire 1-1 when powered up in this way, the processor 17 shown in FIG. 2 receives DC power from wires 20 via the interface 21 and operates switch 16 so as to turn on the LED 15. Furthermore, under the control of a routine stored in memory 18, the processor 17 repeatedly sends "keep alive" signals to the network 6. These keep alive messages can be broadcast signals in the format shown in FIG. 3. The "keep alive" signals are detected by the processor 13 through the associated switching element 8-1 and as long as the messages from the luminaire 1-1 are repeated within a predetermined time period Δ, the processor 13 will command the switching element 8-1 to continue to supply the DC power to the luminaire 1-1. Otherwise, the DC power will be switched off by switching element 8-1 under the control of processor 13.

When the sensor 3-1 is operated to switch off the luminaires, it does so by transmitting a broadcast message to the network 6 in the format of FIG. 3 but with a data payload indicating that luminaires should be switched off.

When the luminaires 1,2 receive the switch off message, their processors 17 shown in FIG. 2 detect the switch off command in the data 23 and operate their respective switches 16 to switch off the LEDs 15 individually. Also, each processor 17 ceases to transmit the "keep alive" signals. Thus, considering for example the luminaire 1-1, after expiry of the predetermined period Δ, the processor 13 disables the switching element 8-1 to turn off DC power supplied to the luminaire 1-1 through wires 20 of Ethernet cable 9-1. In this way, consumption of standby power that would otherwise occur whilst the luminaire 1-1 is switched off is avoided. In the first scenario, all of the luminaires will be switched off and powered down so as to reduce the standby power consumed by the entire network.

The processors 28 of sensors 3,4 are however configured to produce "keep alive" signals repetitively with a periodicty less than the predetermined period Δ and so will remain operational to allow the luminaires to be switched on again by means of the switches.

The processor 13 runs a power control program stored in memory 14 so as to switch off the standby power to the luminaires when the "keep alive" signals cease for more than the predetermined period Δ. Considering the luminaire 1-1 by way of example, the power control process performed by processor 13 is illustrated in the flowchart of FIG. 5. When the processor 13 detects at step S1 the passage of a broadcast signal to switch on the luminaires through switching element 8-1 to the luminaire 1-1, the processor 13 then checks at step S2 whether DC power from line 12 has been switched on through element 8-1 for supply to the luminaire 1-1. If not, the power is switched on as step S3.

At step S4, a time stamp Ts of when the broadcast signal passes through the network switch is read, and a timer process run by the processor 13 is set to run until a time Tmax=Ts+Δ where Δ is the maximum period that the system will wait for successive "keep alive" signals from the luminaire 1-1. The setting of the timer is performed at step S5.

The timer is checked by the processor 13 to see if it has timed out at step S6 before any successive "keep alive" signal has been received from the luminaire 1-1 through element 8-1. If time-out occurs, the DC power is switched off at switching element 8-1 for the luminaire 1-1 at step S7. If a "keep-alive" signal is received before time-out, the process returns to step S4 to set the timestamp when the "keep-alive" signal is received at the switching element 8-1. A new timer is set at step S5, where the timer value is set to Tmax=Ts+Δ. The keep alive signals will be produced successively within a period less than a predefined period Δ until a switch-off signal is received from the network 6 which causes the luminaire 1-1 to switch off, such that the processor 17 ceases to produce the "keep alive" power request signals, after which the timer times out as detected at step S6 and the DC power on wires 20 is switched off at step S7 in order to save power.

It will be seen that in this first scenario, the PoE switches 5, 5' pass the switch-on and switch-off broadcast messages from the switches 3, 4 without having to read their destination address and so no commissioning of the switching elements 8, 8' needs to be carried out.

In a second scenario, the sensors 3-1, 3-2 control only the luminaires associated with the PoE switch 5 i.e. luminaires 1-1 . . . 1-6. Similarly, switches 4-1, 4-2 only control the luminaires associated with PoE switch 5'. Operation of the PoE switch 5 will now be described and it will be understood that PoE switch 5' operates in a similar manner. In the second scenario, a commissioning process is performed initially to associate the sensors 3-1, 3-2 with the luminaires 1-1 . . . 1-6. However, the PoE switch 5 would not itself need to be commissioned since the individual switching elements 8-1 . . . 8-8 and processor 13 need only respond to signal traffic to the individual luminaires in accordance with flowchart of FIG. 5. In the second scenario, sensors 3-1, 3-2 send unicast messages with the individual addresses of the recipient luminaires 1-1 . . . 1-6 embodied in the header 22 of the datagram shown in FIG. 3.

An advantage of the described lighting network is that the PoE switches can be implemented by modification of the firmware of a conventional PoE switch to include the described power control program in its processor memory. Furthermore, there is no requirement to commission the PoE switches as part of the initial network commissioning process.

It will be appreciated that the term "comprising" does not exclude other elements or steps and that the indefinite article "a" or "an" does not exclude a plurality. A single processor may fulfill the functions of several items recited in the claims. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalization thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived there from.

Other modifications and variations falling within the scope of the claims hereinafter will be evident to those skilled in the art.

The invention claimed is:

1. A device comprising:
   a common cable connection,
   wherein the device receives, from a network switch, both electrical power for operation and a command signal to switch on through the common cable connection;
   a luminaire for operating a lighting unit; and
   a processor communicatively coupled to said luminaire and said common cable connection, wherein the processor is configured to control said device such that said device:

in response to receiving the command to switch on, turns on the lighting unit, in response to switching on, sends to the network switch a second signal repeatedly; and in response to receiving, from the network switch, a command signal to switch off, initiates switching off of the processor and power cut off for the device, by ceasing sending of said second signal to the network switch, wherein ceasing the sending of said second signal causes the network switch to stop supplying the electrical power to the device through the common cable connection.

2. The device according to claim 1, further comprising a first switch for controlling operation of the lighting unit, wherein the processor is configured to operate the first switch to turn on the lighting unit in response to the command signal to switch on and to repeatedly send signals through the common cable connection to the network switch until the first switch is turned off.

3. The device according to claim 2, wherein the common cable connection is configured to receive an Ethernet cable.

4. The device according to claim 1, wherein the device is a Power over the Ethernet (PoE) device, and wherein the electrical power and the second signal are transmitted via at least one Ethernet cable.

5. A method of operating the device according to claim 1, said method comprising:

receiving from the network switch both electrical power for operation and the command signal to switch on through the common cable connection;

in response to switching on, sending to the network switch the second signal repeatedly; and in response to receiving the command signal to switch off, initiating switching off of the processor, and power cut off for the device, by ceasing sending of said second signal to the network switch.

6. The method of claim 5, wherein the ceasing causes the network switch to stop providing the electrical power to the device.

7. A system comprising the device of claim 1, which is a first device, and comprising a second device that is the network switch, wherein the second device provides said electrical power to the first device, receives the second signal repeatedly and stops providing the electrical power to the first device in response to said ceasing.

* * * * *